United States Patent Office 3,357,442
Patented Dec. 12, 1967

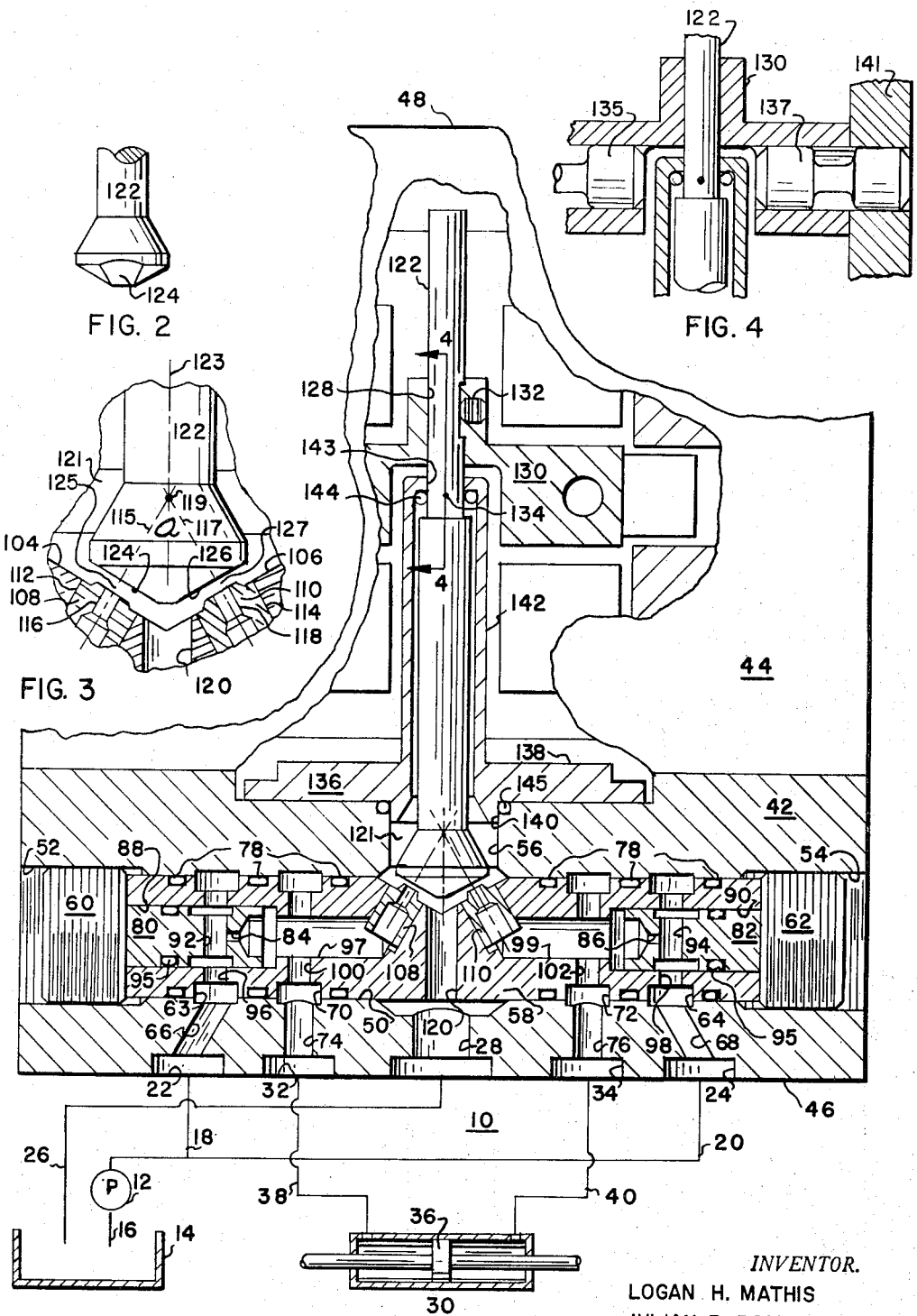

3,357,442
FLAPPER-NOZZLE RELAY
Logan H. Mathis, Southfield, and Julian R. Romans, Dearborn, Mich., assignors to Sperry Rand Corporation, Troy, Mich., a corporation of Delaware
Filed June 28, 1965, Ser. No. 467,413
7 Claims. (Cl. 137—82)

ABSTRACT OF THE DISCLOSURE

A servocontrol having a pair of fluid nozzles whose axes, when projected, converge at an acute angle, and a flapper member having a pair of controlled surfaces each of which is spaced from, but proximate to the end of its respective nozzle and substantially perpendicular to the nozzle axis thus forming a pair of control orifices. The flapper member is supported for movement in response to an input signal so as to increase the flow restrictive effect of one control orifice while simultaneously reducing the flow respective effect of the other to thereby produce an output fluid pressure differential in proportion to the input signal.

---

This invention relates to power transmissions and is particularly applicable to those of the type comprising two or more fluid pressure energy translating devices, one of which may function as a pump and another as a fluid motor.

More particularly, this invention relates to a servocontrol system and more specifically to a flapper-nozzle valve wherein a differential pressure is established between two output pressures proportional in magnitude and sense to an input signal. This valve is particularly useful in electro-hydraulic transducers where the requirements call for minimum size and weight with maximum reliability and performance.

The technology of automatic control systems has advanced rapidly in recent years. Much of this advancement is attributable to the continued development of the electro-hydraulic transducer or servovalve which makes possible the rapid response and accurate control of forces of great magnitude through the application of minute input signals. Such transducers are used on virtually every aircraft and missile produced today. Further, such transducers are finding constantly increasing applications in automatic control systems for industrial machinery and wherever it is desirable to control forces of large magnitude with small input signals. The transducers may be conveniently manifolded to devices, such as linear or rotary type actuators, thereby providing a compact package for applications where low control power, weight, and size factors are critical.

Electro-hydraulic transducers may be catagorized into two classes, i.e., those that provide a controlled pressure or pressure differential and those that provide a controlled flow. The former may be generally designated as a single-stage pressure control servovalve while the latter a two-stage flow control servovalve. The single-stage valve being essentially the first stage of a two-stage valve comprises an input signal responsive means, generally, an electrical torque motor, and a hydraulic flapper-nozzle valve which utilizes a flapper or control member associated with the said electrical torque motor to variably impede fluid flow through a nozzle or nozzles in response to an electrical input signal and thus employs the pressure variation created thereby for various control purposes. Single-stage valves may thus be advantageously used with various types of components, for example, the second stage of a flow control servovalve, relatively small actuators, and any other mechanism requiring a precisely controlled pressure or pressure differential for their proper opeation.

The pressure variations created by single-stage servovalves are accomplished by varying the size of an orifice or the relative size of a pair of orifices. This is generally accomplished by varying the distance between a flapper or control member and the end of the nozzle or pair of nozzles.

Prior art construction teaches the use of a pair of nozzles discharging a fluid stream perpendicular to a flapper such that the full force of the fluid impinges thereon. The nozzles are arranged such that the hydraulic forces oppose one another, for example, a pair of directly opposed nozzles with a flapper interposed or a pair of nozzles equally disposed from the fulcrum of a flapper such that the fluid force exerted on the flapper from each nozzle is directly opposed. The hydraulic forces exerted upon the flapper will be equally balanced when the flapper is in a neutral position, i.e., equidistant from each nozzle. To attain a pressure differential at the output pressure ports, an electrical input signal is imposed upon the torque motor resulting in a torque exerted upon the flapper. This torque tends to move the flapper toward one of the nozzles until the hydraulic forces exerted upon the flapper by the impinging fluid equals the input force upon the flapper. This arrangement may be referred to as a "hydraulic force balance." Such an arrangement may be specifically designed or tailored to provide a pressure differential having a fairly good linearity through a wide input signal range for a specific supply pressure or a relatively narrow range of supply pressures. However, when the hydraulic force rate changes sufficiently, due to changes in supply pressure, the pressure differential becomes non-linear beyond a particular input signal range. The magnitude of non-linearity being a function of the departure of the actual supply pressure from the optimum or rated supply pressure for which the valve was designed. Changes in environmental and temperature conditions, fluid viscosity, and density also adversely affect the linearity and proportionality of the output pressure differential of valves employing the hydraulic force balance arrangement.

The present invention overcomes this problems of non-linearity of output pressure differential with varying supply pressures by reducing the hydraulic forces imposed upon the flapper to a value that is negligible in comparison to a flapper resisting force having a uniform spring rate.

It is an object of this invention to provide a flapper-nozzle valve having a new and improved method of providing a linear and proportional output pressure differential throughout a wide input signal range over a broad range of supply pressures.

It is another object of this invention to provide a new and improved flapper-nozzle valve wherein the hydraulic forces have a negligible effect upon the flapper or control member.

Another object of this invention is to provide a flapper-nozzle valve capable of providing a linear and proportional output differential pressure throughout a wide input signal range over a broad range of environmental and temperature conditions, fluid viscosity, and density changes.

It is another object of this invention to provide a flapper-nozzle valve having an increased contamination tolerance.

Another object of this invention is to provide a flapper-nozzle valve having a new and improved method of simultaneously varying the size of the variable control orifices.

A further object of this invention is to provide improved means of adjusting the size of the variable control orifices.

A still further object of this invention is to provide a means for accurately adjusting the valve to a null position.

A still further object of this invention is to provide a flapper-nozzle valve whose requirements emphasize weight, size, and maximum reliability and performance.

Another object of this invention is to provide a low cost, economical, simple, and durable flapper-nozzle valve.

Further objects and advantages of the present invention will be apparent in the following description, reference being had to the accompanying drawing wherein a preferred form of the present invention is clearly shown.

In the drawing:

FIGURE 1 is a cross-sectional view of the improved flapper-nozzle valve in combination with an electrical torque motor utilized in a basic hydraulic servocontrol system.

FIGURE 2 is a side view of the flapper, rotated 90° from its FIGURE 1 position, illustrating one of the control surfaces.

FIGURE 3 is an enlarged view showing the physical relationship of the flapper and variable control orifice nozzles.

FIGURE 4 is a sectional view taken along the line 4—4 of FIGURE 1.

Referring now to FIGURE 1, the combination of an improved flapper-nozzle valve and an electrical torque motor is generally designated by the numeral 10. This combination is commonly referred to in the art as an electro-hydraulic transducer or single-stage pressure control servovalve.

Pump 12 receives fluid from a sump or reservoir 14 through conduit 16 and delivers the said fluid to the electro-hydraulic transducer 10 at a predetermined constant pressure through conduits 18 and 20, said conduits 18 and 20 being connected to supply ports 22 and 24, respectively. The fluid as it travels through the transducer 10 undergoes several pressure changes, to be described in detail hereinafter, and is eventually returned to reservoir 14 through conduit 26 which is connected to a return port 28. Intermediate pressures are established within the transducer 10 as the fluid flows therethrough, said pressures being in communication with an actuator 30 such that the pressures in pressure ports 32 and 34 act upon opposite sides of a piston 36 through conduits 38 and 40. When the pressure at port 34 is greater than that at port 32, piston 36 will be actuated to the left and similarly, when the pressure in port 32 is greater than that in port 34, piston 36 will be actuated to the right.

The electro-hydraulic transducer 10 comprises a flapper-nozzle valve, generally designated 42, and a conventional input signal responsive means, such as an electrical torque motor 44. The torque motor 44 is firmly attached to body 46 of the flapper-nozzle valve 42 by means, not shown, and is provided with a protective cover 48.

The flapper-nozzle valve 42 comprises body 46 having a longitudinal, cylindrical bore 50, its full length with the exception of threaded portions 52 and 54 at each end thereof. A transverse bore 56, the axis of which intersects the axis of bore 50 at the mid-point of its length, extends to the mating surface between the torque motor 44 and the body 46 and is perpendicular thereto. An adjustable spool 58 is closely fitted and firmly secured within the bore 50 by threaded, adjustable retaining screws 60 and 62. Annuli 63 and 64 abut the spool 58 and partially extending into the bore 50 are in communication with supply ports 22 and 24 by passages 66 and 68, respectively. Similarly, annuli 70 and 72 are in communication with pressure ports 32 and 34 by passages 74 and 76. O-ring type seals 78 (six (6) places) are provided on the outer periphery of spool 58 to prevent both external and internal leakage of fluid from the annuli 63, 70, 72, and 64. To facilitate manufacture, fixed orifice plugs 80 and 82, independent of spool 58, have equal area fixed orifices 84 and 86, and are provided to fit in counterbores 88 and 90 in the ends of the spool 58, and are retained therein by the retaining screws 60 and 62, respectively; each of said plugs 80 and 82 have a fluid chamber 92 and 94 in communication with annuli 63 and 64 by passages 96 and 98 and thus, in communication with the supply ports 22 and 24, respectively, by means previously described. The O-rings designated 95, are utilized on the outer periphery of plugs 80 and 82 to prevent external leakage of fluid from chambers 92 and 94, past the retaining screws 60 and 62.

The spool 58 has two pressure chambers 97 and 99, each respectively in communication with annuli 70 and 72 by passages 100 and 102 and by means previously described in communication with pressure ports 32 and 34. Each pressure chamber 97 and 99 is also in communication with the fluid chambers 92 and 94 by the fixed orifices 84 and 86, respectively. A V-shaped notch at the midlength of spool 58 is formed by the intersection of the planar surfaces 104 and 106 forming an obtuse angle therebetween. Variable control orifice nozzles 108 and 110 are inserted in counterbores 112 and 114, the axis of each nozzle being perpendicular to its respective planar surface. The orifices 116 and 118 in nozzles 108 and 110 are substantially equal in area and their axes 115 and 117, respectively, when extended, intersect at a point 119 disposed from the periphery of the spool 58 forming an acute angle $a$. Passage 120 in spool 58 connects cavity 121 formed by the transverse bore 56 and the V-shaped notch in spool 58 to return port 28, thus providing means of returning fluid flowing into said cavity 121 through nozzles 108 and 110.

Flapper 122 has a pair of flat control surfaces 124 and 126 formed on the conical-shaped end thereof as shown in FIGURES 2 and 3, the angle formed by said surfaces 124 and 126 being equal to the included angle formed by the V notch and substantially parallel to the planar surfaces 104 and 106 and perpendicular to the axes 115 and 117 of orifices 116 and 118; when the flapper 22 and spool 58 are centralized or in the null position, said surfaces 24 and 126 will be equally displaced from, but proximate to, the ends of the nozzles 108 and 110, thus forming variable control orifices 125 and 127.

The size or area of each variable control orifice 125 and 127 is the circumference of the orifice 116 or 118 multiplied by the distance between the end of the nozzles 108 or 110 and its respective control surface 124 or 126.

The end of the flapper 122 opposite the control surfaces 124 and 126 extends into the torque motor 44 through a hole 128 in torque motor armature 130 and is secured secured thereto by a set screw 132, said set screw 132 permitting adjustment of the flapper 122 so as to simultaneously vary the size of the variable control orifices 125 and 127, i.e., the distance between the control surfaces 124 and 126 and the ends of said nozzles 108 and 110. The null position of the transducer 10 is easily and accurately attainable by longitudinally adjusting spool 58 until the size of the variable control orifices 125 and 127 are equal. Both adjustments can be accomplished while the transducer 10 is in operation by alternately adjusting screws 60 and 62 until the spool 58 is properly positioned with respect to the flapper 122 or by axially adjusting the flapper 122 along its axis 123 to the desired flow-pressure relationship and locking the flapper 122 in place with the set screw 132. Since the distance between the control surfaces 124 and 126 and the ends of the nozzles 108 and 110 varies as a function of the acute angle $a$ and not solely as a function of the movement of either the flapper 122 or spool 58, more accuracy in adjustment results. The armature 130 is arranged in such a manner that it and the flapper 122 pivots about an axis through point 134 which intersects axis 123 of the flapper 122. When the flapper 122 and the spool 58 are in a centralized position as illustrated in FIGURE 1, the axes 115 and 117 of the nozzle orifices 116 and 118 when extended intersect the flapper axis 123 at point 119, said point 119 interposing the pivot point 134 and the periphery of spool 158. Flapper torsion springs 135 and 137 shown in FIGURE 4 are rigidly mounted in the armature 130 and to frame 141 of the torque motor 44 and serve to center the flapper 122 to its neutral position and resist a torque imposed upon the armature 130 by an electrical input signal to the torque motor 44.

A fluid barrier, designated 136, comprises a circular flange 138 mounted to the valve body 46 by means not shown; a smaller circular diameter 140, on one side thereof, piloted in the transverse bore 56; and on the opposite side of flange 138, an inverted cup-shaped cylindrical member 142 which extends just beyond the pivot point 134 of the flapper 122 and armature 130. A hole 143 in the end of the cylindrical member 142 is provided to allow the flapper 122 to extend therethrough. An O-ring seal 144 is utilized on the periphery of flapper 122, at its pivotal point, and retained by the cupped end of member 142 to prevent leakage of any fluid into the torque motor 44 during static or dynamic operation of the flapper 122. The seal 145 prevents leakage of fluid from chamber 121 between diameter 140 and bore 56 into the torque motor 44.

In operation, the pump 12 provides fluid to inlet ports 22 and 24 of the electro-hydraulic transducer 10 at some predetermined fluid supply pressure, said fluid pressure remaining substantially unchanged as it passes from ports 22 and 24 through their respective passages and annuli into chambers 92 and 94. The fluid pressures in chambers 92 and 94 are, therefore, equal in magnitude. The equal area orifices 84 and 86 restrict the passage of fluid causing equivalent pressure drops as the fluid passes from chambers 92 and 94 into pressure chambers 97 and 99, the fluid pressure therein being equal, yet lower in magnitude than the pressure in chambers 92 and 94. As the fluid flows into cavity 121, through nozzles 108 and 110, the fluid undergoes a second pressure drop, the relative magnitude of which depends upon relative size of the variable control orifices 125 and 127. When the flapper 122 is in a null position, the size of the variable control orifices 125 and 127 will be equal and thus, the resistance to fluid flow as fluid passes from the chambers 97 and 99 into cavity 121 will be equal resulting in equivalent pressure drops. The fluid entering cavity 121 is returned to the reservoir 14 through passage 120, ports 28, and conduit 26. Pressures developed in chambers 97 and 99 are imposed upon opposite sides of piston 36 of actuator 30 through their respective passages, annuli, pressure ports, and conduits, said pressures being equal when the flapper 122 is in its null position.

When a differential electrical input signal is imposed upon the torque motor 44, the flapper 122 will be displaced to the right or the left, pivoting about the axis 134. The direction and magnitude of displacement of said flapper 122 from its null position is dependent upon the magnitude and sense of the differential electrical signal imposed upon the torque motor 44. To illustrate, a postive input signal displaces the flapper 122 to the right toward nozzle 110 and conversely, a negative input signal displaces the flapper 122 to the left toward nozzle 108.

With flapper 122 in its null position, the resistance of the variable control orifices 125 and 127 will be identical and thus, the hydraulic fluid forces created by the impinging fluid upon the flapper 122 as it is discharged through the nozzles 108 and 110 upon the control surfaces 124 and 126 will be equal in magnitude. These forces may be represented by their vectorial force components, the larger of which exerts an axial force upon the flapper 122 along its axis 123. The horizontal fluid force component exerted on the flapper 122 by each nozzle oppose one another and are equal when the flapper 122 is in its null position. When the flapper 122 is displaced from its null position, the resistance of the variable control orifices 125 and 127 correspondingly changes creating an unbalanced force upon the flapper 122 which acts in opposition to flapper 122 movement. However, this opposing force being a component of the total hydraulic force exerted upon flapper 122 is extremely small in comparison to the resisting force of the flapper torsion springs 135 and 137 and thus, may be considered negligible and therefore, have essentially no effect upon the operation or performance of the flapper-nozzle valve 42.

A positive electrical signal imposed upon the torque motor 44 causes the flapper 122 to be displaced to the right of its null position until the output torque of the torque motor 44 is counterbalanced by the resisting torque of the flapper torsion springs 135 and 137. As the flapper moves to the right, the resistance of the variable control orifice 127 increases and the resistance of the variable control orifice 125 decreases. This results in an increased pressure in chamber 99 and a reduction in pressure in chamber 97, thus establishing a differential pressure between the pressure ports 32 and 34 and an unbalanced force upon the piston 36 causing the same to be actuated to the left. The pressure differential established between the pressure ports 32 and 34 will be proportional to the supply pressure and the electrical input signal imposed upon the torque motor 44, this proportionately being linear throughout the input signal range at any given supply pressure within the supply pressure range. For example, for any given supply pressure, the pressure differential established at the pressure ports 32 and 34 will be proportional to the electrical input signal imposed upon the torque motor 44 and will correspondingly increase or decrease in a linear fashion as the input signal is increased or decreased. Similarly, if the supply pressure is increased or decreased, the pressure differential will proportionally increase or decrease and continue to provide a linear pressure differential throughout the input signal range at the new supply pressure.

Conversely, when a negative input signal is imposed upon the torque motor 44, the flapper 122 will be displaced to the left of its null position, thus resulting in a pressure increase in chamber 97 and a pressure reduction in chamber 99, thereby establishing a pressure differential proportional to the input signal and supply pressure between the pressure ports 32 and 34 such that piston 36 will be actuated to the right.

It is apparent that the improved flapper-nozzle valve described herein provides improved performance and increased response by the reduction of the hydraulic forces exerted on the flapper 122. This valve premits a desirable degree of flexibility and may be utilized with various types of pressure controllable devices where the requirements call for maximum reliability and performance with minimum size and weight.

While the form of embodiment of the invention as herein disclosed constitutes a preferred form, it is to be understood that other forms might be adopted, all coming within the scope of the claims which follow.

What is claimed is as follows:

1. In a transducer for converting an input movement into an inverse variation between two output pressures, the combination of:

means forming a pair of nozzles having discharge axes which, projected, converge at an acute angle;

means for supplying a controlled flow of fluid to each of said nozzles;

a flapper member having a pair of control surfaces, each surface being spaced from but proximate to one of said nozzles and lying on a plane disposed substantially perpendicular to the axis of the nozzle to which it is proximate, thus forming a pair of control orifices;

and means for supporting said flapper member for movement to inversely affect the spacing between said control surfaces and said nozzles and thus vary the flow restrictive effect of said control orifices.

2. The combination defined in claim 1 in which said flapper is supported for movement about a pivotal axis which intersects a line bisecting said acute angle, said pivotal axis being more remote from said nozzles than the point of convergence of said nozzle axes.

3. The combination defined in claim 1 in which the nozzles are conjointly adjustable relative to the flapper supporting means.

4. The combination defined in claim 1 in which the flapper is adjustable to vary the size of the control orifices.

5. The combination defined in claim 2 in which the nozzles are conjointly adjustable relative to the flapper supporting means in a direction perpendicular to the line bisecting said acute angle.

6. The combination defined in claim 2 in which the flapper is adjustable along a line bisecting said acute angle and intersecting said pivotal axis to equally vary the size of the control orifices.

7. In a transducer for converting an input movement in to an inverse variation between two output pressures, the combination of:

a body member having a bore extending therethrough and an opening extending radially from said bore to the body exterior;

a spool slideably fitted in said bore;

a pair of nozzles in said spool said nozzles having converging axes of discharge disposed at equal, acute angles with the axis of said bore and directed toward said opening;

means for supplying a controlled flow of fluid to each of said nozzles;

a flapper member mounted on said body and projecting through said opening into said bore, said flapper member having a pair of control surfaces, each surface spaced from but proximate to one of said nozzles and being substantially perpendicular to the discharge axes of the nozzle to which it is proximate;

control means for moving said flapper member axially of said bore;

means for slideably adjusting the axial location of said spool in said bore and locking it in place;

and means for simultaneously adjusting the spaces interposing said control surfaces of said nozzles.

References Cited

UNITED STATES PATENTS 3,135,294   6/1964   Huber _____ 137—625.61
3,211,182  10/1965   Gyurik _____ 91—51 X ALAN COHAN, *Primary Examiner.*